(12) United States Patent
Huang et al.

(10) Patent No.: US 10,863,373 B2
(45) Date of Patent: Dec. 8, 2020

(54) MECHANISMS OF VIRTUAL CLEAR CHANNEL ASSESSMENT FOR WI-FI DEVICES

(71) Applicant: Intel IP Corporation, Santa Clara, CA (US)

(72) Inventors: Po-Kai Huang, San Jose, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 64 days.

(21) Appl. No.: 16/217,889

(22) Filed: Dec. 12, 2018

(65) Prior Publication Data

US 2019/0230533 A1 Jul. 25, 2019

Related U.S. Application Data

(63) Continuation of application No. 15/116,009, filed as application No. PCT/US2014/032239 on Mar. 28, 2014, now Pat. No. 10,182,362.

(51) Int. Cl.
| | |
|---|---|
| *H04W 16/10* | (2009.01) |
| *H04W 24/04* | (2009.01) |
| *H04W 24/08* | (2009.01) |
| *H04L 12/26* | (2006.01) |
| *H04W 16/08* | (2009.01) |

(Continued)

(52) U.S. Cl.
CPC ............. *H04W 24/08* (2013.01); *H04L 43/16* (2013.01); *H04W 16/10* (2013.01); *H04W 16/08* (2013.01); *H04W 72/046* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,854,607 B1* | 12/2017 | Chu | .................... H04W 52/241 |
| 10,182,362 B2 | 1/2019 | Huang et al. | |
| 10,225,806 B2* | 3/2019 | Oteri | ................... H04W 52/243 |

(Continued)

FOREIGN PATENT DOCUMENTS

| | | |
|---|---|---|
| CN | 1996908 | 5/2010 |
| EP | 3123804 B1 | 12/2019 |

(Continued)

OTHER PUBLICATIONS

"International Application Serial No. PCT US2014 032239, International Search Report dated Dec. 18, 2014", 3 pgs.

(Continued)

*Primary Examiner* — Duc T Duong
(74) *Attorney, Agent, or Firm* — Schwegman Lundberg & Woessner, P.A.

(57) ABSTRACT

Described are methods and devices for increasing the efficiency of Wi-Fi networks by increased spatial reuse, which refers to sharing the same wireless spectral resources over different spatial regions. A described technique for doing this is for a Wi-Fi device to increase the threshold of the clear channel assessment (CCA) so as to ignore and regard as interference the transmissions from other devices. The sensing range of the Wi-Fi device then decreases, and the spatial resource can be reused by different Wi-Fi devices in different spatial locations.

20 Claims, 4 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2005/0058151 | A1 | 3/2005 | Yeh |
| 2007/0060155 | A1 | 3/2007 | Kahana et al. |
| 2007/0270102 | A1 | 11/2007 | Zhu et al. |
| 2007/0286122 | A1 | 12/2007 | Fonseca |
| 2008/0008133 | A1 | 1/2008 | Zhu et al. |
| 2008/0267079 | A1 | 10/2008 | Mhatre et al. |
| 2010/0316013 | A1 | 12/2010 | Jin et al. |
| 2012/0082109 | A1 | 4/2012 | Hong et al. |
| 2013/0012134 | A1 | 1/2013 | Jin et al. |
| 2013/0017794 | A1 | 1/2013 | Kloper et al. |
| 2014/0328270 | A1 | 11/2014 | Zhu et al. |
| 2015/0092703 | A1 | 4/2015 | Xu et al. |
| 2015/0131641 | A1* | 5/2015 | Ong ............... H04W 48/20 370/338 |
| 2016/0066349 | A1* | 3/2016 | Seok ............... H04W 24/02 370/338 |
| 2016/0081010 | A1* | 3/2016 | Seok ............ H04W 74/0816 370/329 |
| 2016/0174079 | A1 | 6/2016 | Wang et al. |
| 2017/0027001 | A1* | 1/2017 | Choi ............ H04W 74/0816 |
| 2017/0126363 | A1* | 5/2017 | Wang ................ H04L 1/0061 |
| 2017/0134975 | A1 | 5/2017 | Huang et al. |
| 2017/0230149 | A1 | 8/2017 | Wang et al. |

FOREIGN PATENT DOCUMENTS

| | | |
|---|---|---|
| KR | 1020100092103 | 8/2010 |
| TW | 201404075 | 1/2014 |
| TW | 201541915 | 11/2015 |
| TW | I605698 | 11/2017 |
| WO | 2015147874 | 10/2015 |

OTHER PUBLICATIONS

"International Application Serial No. PCT US2014 032239, Written Opinion dated Dec. 18, 2014", 6 pgs.

"Taiwanese Application Serial No. 104104556, Office Action dated Apr. 20, 2016", w English Translation, 10 pgs.

"Clear channel assessment in wireless sensor networks", Proceeding ACM-SE 46 Proceedings of the 46th Annual Southeastregional Conference on XX XP055418037, ACM New York, NY, USA DOI:10.1145 I 1593105.1593227, ISBN:978-1-60558-105-7, (Jan. 1, 2008), 6 pgs.

"Taiwanese Application Serial No. 104104556, Response Filed May 17, 2017 to Office Action dated Nov. 22, 2016", w English Claims, 72 pgs.

"U.S. Appl. No. 15/116,009, Non Final Office Action dated Nov. 17, 2017", 9 pgs.

"European Application Serial No. 14886690.8, Response filed Apr. 4, 2019 to Communication Pursuant to Article 94(3) EPC dated Dec. 14, 2018", 17 pgs.

"European Application Serial No. 14886690.8, Communication Pursuant to Article 94(3) EPC dated Dec. 14, 2018", 5 pgs.

"European Application Serial No. 14886690.8, Response filed Jun. 1, 2018 to Extended European Search Report dated Nov. 2, 2017", 19 pgs.

"U.S. Appl. No. 15/116,009, Response filed Feb. 20, 2018 to Non Final Office Aciton dated Nov. 17, 2017", 10 pgs.

"International Application Serial No. PCT US2014 032239, International Preliminary Report on Patentability dated Oct. 13, 2016", 8 pgs.

"U.S. Appl. No. 15/116,009, Notice of Allowance dated Sep. 7, 2018", 5 pgs.

"Taiwanese Application Serial No. 104104556, Office Action dated Nov. 22, 2016", w English Translation, 21 pgs.

"U.S. Appl. No. 15/116,009, Response Filed Aug. 1, 2018 to Final Office Action dated Jun. 1, 2018", 9 pgs.

"U.S. Appl. No. 15/116,009, Final Office Action dated Jun. 1, 2018", 9 pgs.

"European Application Serial No. 14886690.8, Extended European Search Report dated Nov. 2, 2017", 11 pgs.

* cited by examiner

MECHANISMS OF VIRTUAL CLEAR CHANNEL ASSESSMENT FOR WI-FI DEVICES

CLAIM OF PRIORITY

This application is a continuation of U.S. patent application Ser. No. 15/116,009, filed Aug. 2, 2016, which is a U.S. National Stage Application under 35 U.S.C. 371 from International Application No. PCT/US2014/032239, filed Mar. 28, 2014, which is hereby incorporated by references in its entirety.

TECHNICAL FIELD

Embodiments described herein relate generally to wireless networks and communications systems.

BACKGROUND

Due to the proliferation of 802.11 (Wi-Fi) devices and the corresponding needs by operators to deploy more Wi-Fi access points (APs), it is expected that future 802.11 (Wi-Fi) networks will typically be in high density environments. The current Wi-Fi channel access mechanism, carrier sense multiple access/collision avoidance (CSMA/CA), is not efficient, however, when the number of accessing devices becomes very large. How to increase the efficiency of Wi-Fi networks in a high density environment is a concern of the present disclosure.

DETAILED DESCRIPTION

The efficiency of Wi-Fi networks may be increased by increased spatial reuse, which refers to sharing the same wireless spectral resources over different spatial regions. One technique for doing this would be for a Wi-Fi device to increase the threshold of the clear channel assessment (CCA) so as to ignore the transmissions from other devices (i.e., regard those transmissions as interference). The sensing range of the Wi-Fi device would then decrease, and the spectral resource could be reused by different Wi-Fi devices in different spatial locations.

802.11 Network Description

Figure 1:
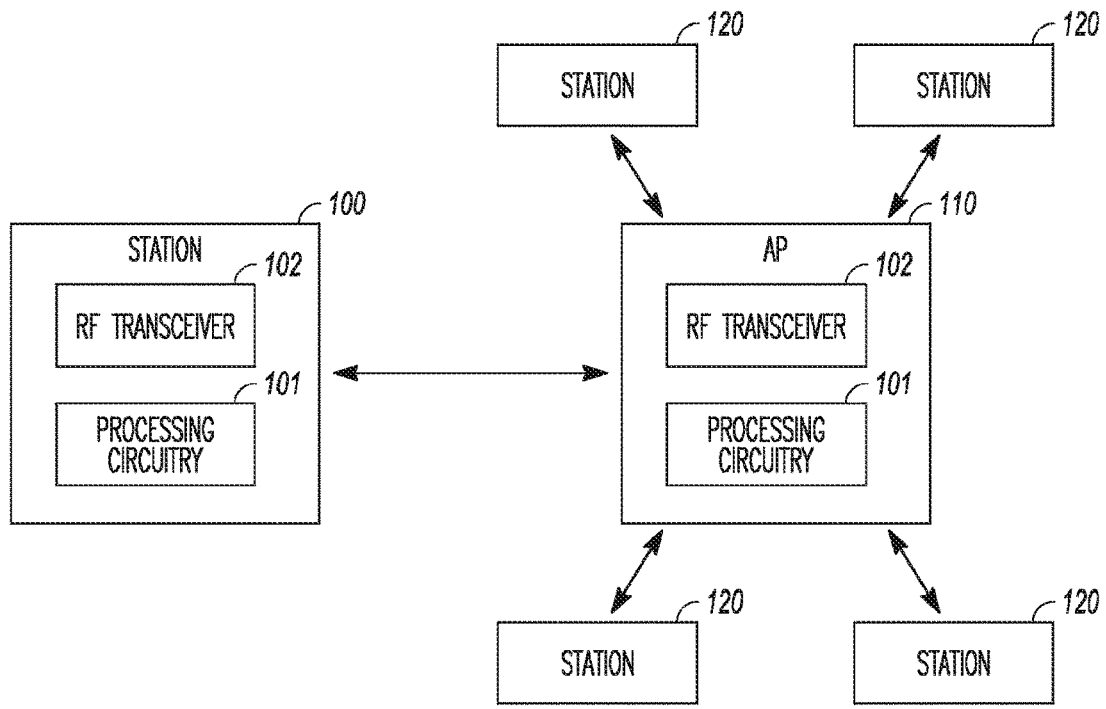
FIG. 1 illustrates a basic service set that includes a station device associated with an access point.
Figure 2:
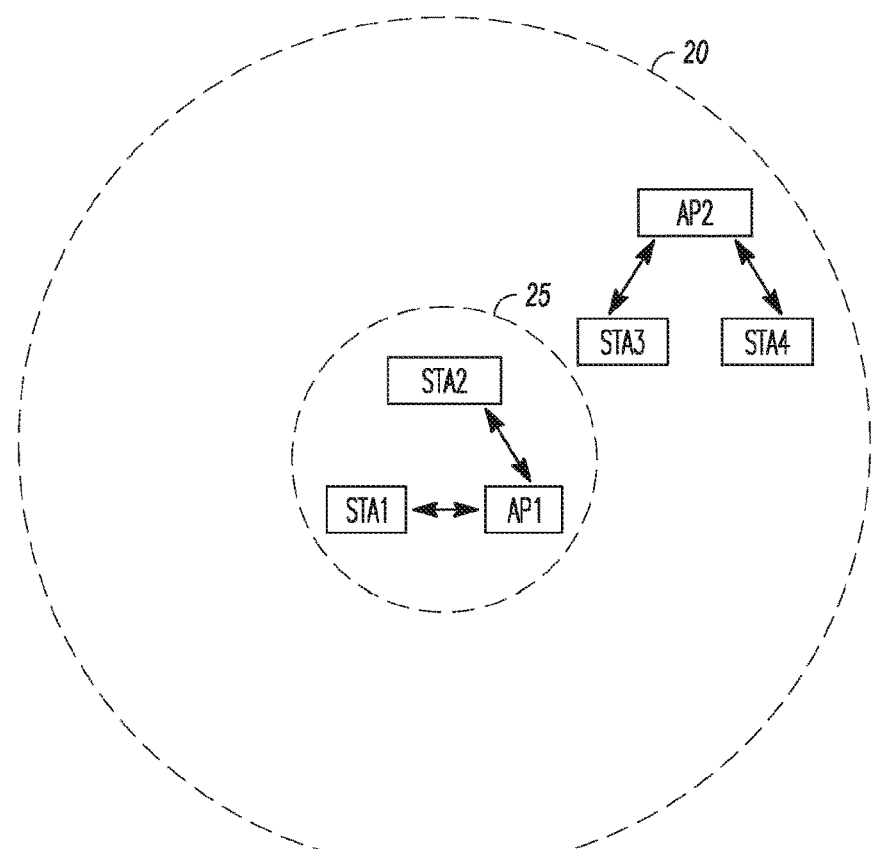
FIG. 2 depicts an example scenario involving two neighboring basic service sets.

In an 802.11 local area network (LAN), the entities that wirelessly communicate are referred to as stations. A basic service set (BSS) refers to a plurality of stations that remain within a certain coverage area and form some sort of association. In one form of association, the stations communicate directly with one another in an ad-hoc network. More typically, however, the stations associate with a central station dedicated to managing the BSS and referred to as an access point (AP). FIG. 1 illustrates a BSS that includes a station device 100 associated with an access point (AP) 110, where the AP 110 may be associated with a number of other stations 120. The device 100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 102 and processing circuitry 101 as shown by the depictions of devices 100 and 110. The processing circuitry includes the functionalities for WiFi network access via the RF transceiver as well as functionalities for processing as described herein. The RF transceivers of the station device 100 and access point 110 may each incorporate one or more antennas. The RF transceiver 100 with multiple antennas and processing circuitry 101 may implement one or more MIMO (multi-input multi-output) techniques such as spatial multiplexing, transmit/receive diversity, and beam forming. The devices 100 and 110 are representative of the wireless access points and stations referenced in FIGS. 2-10.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. Data frames carry data from station to station. Control frames, such as request-to-send (RTS) and clear-to-send (CTS) frames are used in conjunction with data frames deliver data reliably from station to station. Management frames are used to perform network management functions. Management frames include beacon frames which are transmitted periodically by the AP at defined beacon intervals and which contain information about the network and also indicate whether the AP has buffered data which is addressed to a particular station or stations. Other management frames include probe request frames sent by a station probing for the existence of a nearby AP and probe response frames sent by an AP in response to a probe request frame.

The 802.11 MAC supports contention-based shared access to the wireless medium through a technique called carrier sense multiple access with collision avoidance (CSMA/CA). A station that wants to transmit over the wireless medium first performs a clear channel assessment (CCA) by sensing the medium for a fixed duration, the distributed control function (DCF_inter-frame space (DIFS). If the no transmissions with energy above the CCA threshold are received, then the station assumes that the medium is idle and begins transmission. Otherwise, the medium is assumed to be busy, and the station waits for the medium to go idle. It then again senses the medium for one DIFS plus a random backoff period. If the medium remains idle for this period, the station assumes that the medium is not busy and begins transmission. Once a station begins transmission, it may keep control of the medium by maintaining a minimum duration, the short inter-frame space (SIFS), between frames in a sequence. Other stations are not able to gain access to the medium during that sequence because the SIFS is shorter than the DIFS.

The MAC layer uses both physical and virtual carrier sense mechanisms to determine if the medium is busy. The physical carrier sense mechanism compares the energy of received signals with the CCA threshold determine if the medium is busy. The virtual carrier sense mechanism uses reservation information carried in the duration field of MAC frame headers announcing impeding use of the medium, which reservation information is called the network allocation vector (NAV). Each MAC frame carries a duration field with a NAV indicating the duration for which the sending station expects the medium to be busy as referenced from the end of the MAC frame. All frames include the duration field and may set the NAV in any neighboring station as long as the frame is successfully demodulated by the neighboring station.

Raising CCA Threshold to Increase Spatial Reuse

Although simply raising the CCA threshold has the potential to increase network efficiency, there are practical issues that need to be addressed. For example, consider the Wi-Fi network shown in FIG. 2. There are two basic service sets (BSS): BSS1 created by access point AP1 and BSS2 created by access point AP2. Stations STA1 and STA2 associate with access point AP1. Stations STA3 and STA4 associate with access point AP2. The dashed circle 20 illustrates the sensing range of STA2 which encompasses the devices in both BSS1 and BSS2. The sensing range is determined by the CCA threshold employed by STA2 to determine if the wireless channel is busy or not. Assume that STA2 raises the CCA threshold so as regard the weaker transmissions from the devices in BSS2 as interference. The sensing threshold of STA2 after raising the CCA threshold is shown as dashed line 25. Now, when STA2 uplink traffic it will ignore the transmissions from the stations in the BSS2 rather than doing backoff. However, this implies that STA2 could not receive the beacons transmitted by AP2 which creates problems for fast handoff among BSSs. To make sure that it can decode packets transmitted by STA2, AP1 should also increase its CCA threshold and set conditions such that it will not determine the medium as busy and decode the packets transmitted by the stations from BSS2 when it waits for the packet from STA2. However, this implies that AP1 may not receive a probe request transmitted by STA3 and creates problems for fast handoffs among BSSs. Also, if STA3 and STA4 are legacy devices and do not correspondingly raise their CCA thresholds, then when STA2 raises the CCA threshold, it may corrupt the existing transmissions of STA3 and STA4. To achieve increased spatial reuse, it is therefore important to decide when and how to adjust CCA threshold.

In order to deal with these issues, described herein are the uses of a virtual CCA threshold and a spatial reuse phase such that a device will not affect the legacy devices or ignore the packets that are destined to them after increasing the CCA threshold. Also described are rules that devices may be configured to follow in determining the value of the virtual CCA threshold in order to eliminate some transmission errors during the spatial reuse phase.

Virtual CCA Threshold

During normal operations, a device employs a specified CCA threshold, referred to herein as the normal threshold, to distinguish packet reception from interference or noise. The virtual CCA threshold is a second CCA threshold for spatial reuse that is greater than the normal CCA threshold. The virtual CCA threshold is only applied by a Wi-Fi device in a specific phase called the spatial reuse phase. Outside the spatial reuse phase, the device will use the normal CCA to detect packet reception. Once a spatial reuse phase is created, devices may be configured to not transmit broadcast frames for the duration of the spatial reuse phase. As a result, the device that raises the CCA threshold will not miss the important broadcast frames such as a beacon frame or a probe request frame. Further, legacy devices may be configured to not transmit during the spatial reuse phase so that transmissions from legacy devices will not be corrupted.

Creation of Spatial Reuse Phase

Figure 3:
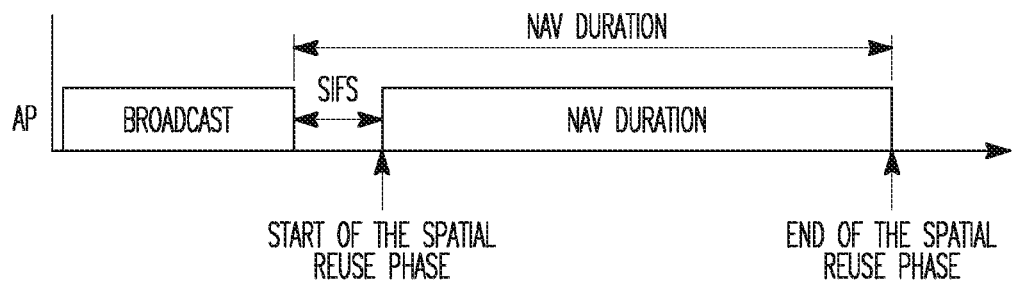
FIG. 3 shows the explicit creation of a spatial reuse phase by a broadcast frame from AP.
Figure 4:
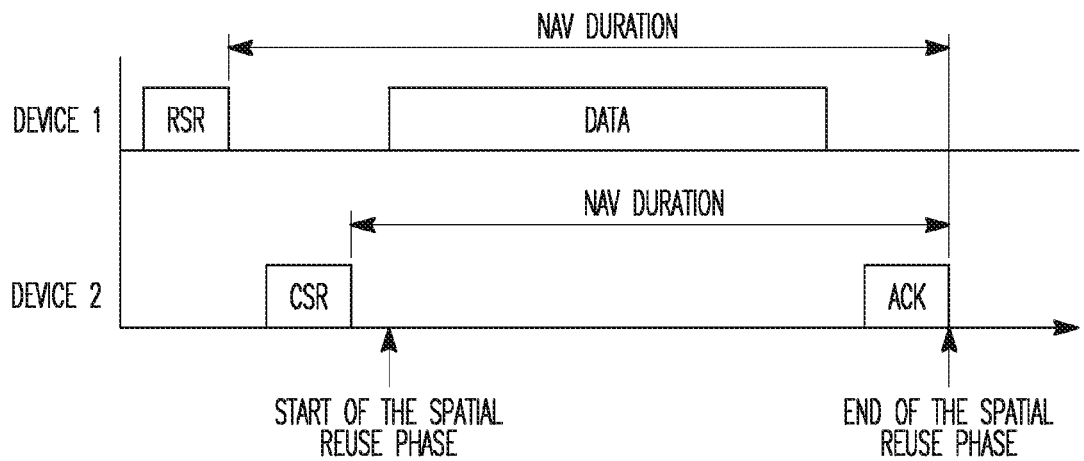
FIG. 4 shows the explicit creation of a spatial reuse phase by exchange of RSR and CSR frames between two devices.

In one embodiment, the spatial reuse phase is created explicitly. For example, a device such as an AP may announce a spatial reuse phase by broadcasting a frame having that information and setting part of the NAV duration as the spatial reuse phase. The start time of the spatial reuse phase may be separated from the end time of the broadcast frame by one SIFS, in which case the start time of the spatial reuse phase may be inferred by every device that receives the broadcast frame. An example is shown in FIG. 3. The AP transmits a broadcast frame that announces to compliant devices that a spatial reuse phase is to be initiated. The broadcast frame also sets the NAV duration as the duration the spatial reuse phase which starts one SIFS after the end of the broadcast frame. Note that legacy devices will not transmit in the spatial reuse phase because the NAV duration will cause the legacy devices defer in the spatial reuse phase. Compliant devices that can perform spatial reuse, on the other hand, will recognize the spatial reuse phase and apply the virtual CCA threshold. In another embodiment for explicit creation of the spatial reuse phase, two devices exchange specific frames that create the spatial reuse phase. These frames may be any type of frames and are referred to herein as an RSR (Request for spatial reuse) frame and a CSR (Clear for Spatial Reuse) frame. Every device that receives the RSR or CSR can then infer that the start time of the spatial reuse phase is the start time of the data transmission. An example is shown in FIG. 4 in which device 1 transmits the RSR frame and device 2 transmits the CSR frame. Both devices may set the NAV duration such that legacy devices will defer in the spatial reuse phase.

Figure 5:
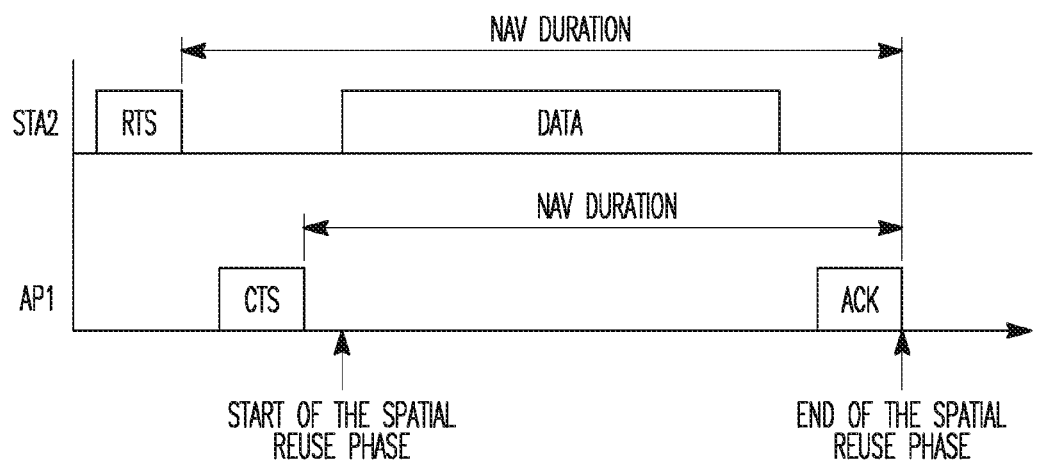
FIG. 5 shows the implicit creation of a spatial reuse phase by exchange of RTS and CTS frames between two devices.
Figure 6:
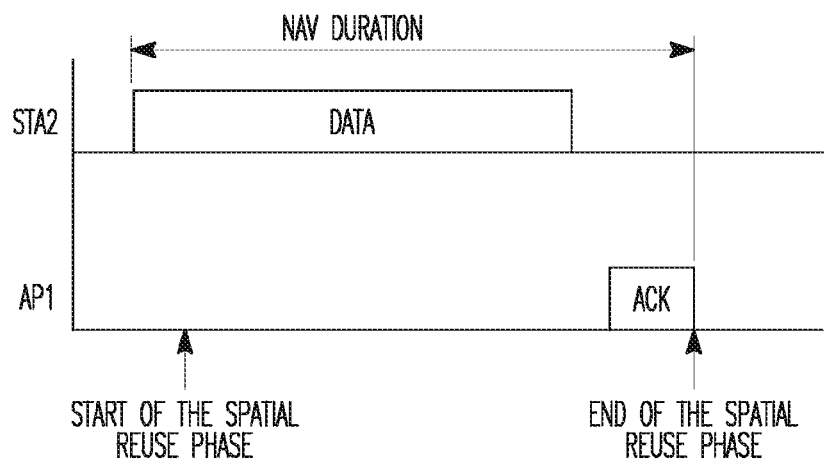
FIG. 6 shows the implicit creation of a spatial reuse phase by a header in a data frame.

In another embodiment, the spatial reuse phase is created implicitly. For example, a compliant device that is capable of doing spatial reuse may mark part of the NAV duration of its data transmission as the spatial reuse phase. This could be done with or without RTS/CTS exchange. FIGS. 5 and 6 illustrate examples with reference to devices AP1 and STA2 in FIG. 2 In FIG. 5, device STA2 marks the spatial reuse phase by doing an RTS/CTS exchange with access AP1. The spatial reuse phase then begins at the starting time of the data transmission and lasts for the durations of the data transmission, one SIFS, and the duration of an ACK frame from AP1. In FIG. 6, there is no preceding RTS/CTS exchange, and device STA2 marks the spatial reuse phase by the header in the data packet. The spatial reuse phase then begins at the time when the overhearing devices decode the header of the data transmission in order to recognize the spatial reuse phase and lasts for the durations of the data transmission, one SIFS, and the duration of an ACK frame from AP. Note that for both examples, legacy devices will simply defer in the spatial reuse phase due to the NAV transmitted by the device that creates the spatial reuse phase.

Determining the Receiver in the Spatial Reuse Phase

Once a device recognizes the opportunity of spatial reuse, it may proceed with transmission. However, to make sure that the benefits of spatial reuse will manifest, the devices that want to transmit a frame in the spatial reuse phase s may be configured to conform to one or more of the following rules. A first rule mandates that a device will not broadcast a frame in a spatial reuse phase. If the transmitter broadcasts a frame, then all the devices in the coverage region may need to decode the frame. This rule thus prevents the devices in the region doing spatial reuse and limits the benefits of spatial reuse. A second rule states that a device should only try to transmit in the spatial reuse phase to receivers with a large enough signal strength (e.g., to receivers in the same BSS and/or to receivers with a signal strength above a specified threshold). If the signal strength between the transmitter and the receiver is very small, then the room for increasing the CCA threshold will be small, and it is not as beneficial for spatial reuse. A third rule would only allow a device to try to transmit in the spatial reuse phase to a receiver when the device has enough data to fit in the transmission time of spatial reuse phase. That is, the device should only transmit data to a receiver during the spatial reuse phase if the duration of the data transmission is above a specified threshold relative to the duration of the spatial reuse phase. If the transmitter does not have enough data for the spatial reuse phase, then it may only transmit for a short period of time after it grabs the transmission opportunity. This forces other stations to defer and limits the benefits of spatial reuse.

Determining the Virtual CCA Threshold

Roughly speaking, the virtual CCA threshold determines the interference level that a transmission can tolerate during the spatial reuse phase. For a receiver, the virtual CCA threshold exactly determines the interference level for the transmission. For a transmitter, the virtual CCA threshold determines if it should backoff when other transmitters transmit and does not exactly determine the interference level for the transmission. Since the interference that a transmission can tolerate depends on the signal strength of the transmission, the virtual CCA threshold V for both transmitters and receivers should be a function $f$ of the signal strength S of the transmission, expressed as:

$$V=f(S)$$

In general, how to determine the optimal function $f$ for all devices in a region may be complicated. Devices could be configured, however, to follow one or more of the following rules.

A first rule would state that, for a device that acts as a receiver, the virtual CCA threshold should not be larger than the energy level of the potential transmitters that may transmit to it. Consider the example in FIG. 2. If the rule is to let the device only transmit to the other devices in the same BSS in the spatial reuse phase, then AP1 should set the virtual CCA threshold smaller than the energy level from STA1 or STA2. Hence, AP1 will report the medium as busy when STA1 or STA2 transmits the packet to AP1.

A second rule says that, for a device that acts as a receiver, the virtual CCA threshold should be set to be larger than the energy level of non-potential transmitters. Consider the example in FIG. 2. If the rule is to let the device only transmit to the other devices in the same BSS in the spatial reuse phase, then AP1 could set the virtual CCA threshold larger than the energy level from STA3 or STA4. Hence, when STA3 or STA4 is transmitting, AP1 can abort the reception in the PHY layer if the receiving energy is less than the virtual CCA threshold.

A third rule says that, for a device that acts as a transmitter, the virtual CCA threshold should not be larger than the energy level of the potential transmitters that may transmit to its receiver. Consider the example in FIG. 2. Suppose the rule is to let the device only transmit to the other devices in the same BSS in the spatial reuse phase, and STA2 will transmit to AP1 in the spatial reuse phase. Then, STA 2 should set the virtual CCA threshold smaller than the energy level from STA1 because STA1 may also transmit to AP1.

A fourth rule says that, for a device that acts as a transmitter, the virtual CCA threshold should not be larger than the energy level from the receiver. There are two reasons for this rule. First, if the virtual CCA threshold is larger than the energy level from the receiver, the transmitter may ignore the ACK from the receiver after it transmits. Second, if the virtual CCA threshold is larger than the energy level from the receiver, the transmitter may still transmit even though the receiver decides to transmit to other devices. This may lead to transmission error.

Figure 7:
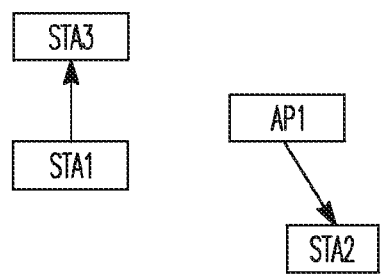
FIG. 7 illustrates an example scenario in which the AP adjusts the virtual CCA threshold.

A fifth rule says that, if a device knows that another transmitter will not transmit to itself or to its receiver, then the device does not take the energy level of these transmitters into consideration. An example is shown in FIG. 7. Suppose that STA1, STA2, and STA3 are associated with AP1. Hence, they are in the same BSS set. When AP1 transmits to STA2 and marks the NAV duration of its data transmission as the spatial reuse phase, STA1 and STA3 do not need to set the virtual CCA threshold smaller than the energy levels from AP1 as described above for the first and second rules.

Transmission in the Spatial Reuse Phase

After the spatial reuse phase is created, any devices that want to do spatial reuse can transmit in the spatial reuse phase when they are able to access the wireless medium using the virtual CCA. Note that a typical transmission involves two steps: (1) the transmitter transmits its data and (2) the receiver transmits the ACK in response. Hence, there are several options to transmit in a spatial reuse phase. Consider FIG. 2 as an example. Suppose STA2 transmits to AP1 and announces a spatial reuse phase as shown in FIG. 5. Then AP2 wants to transmit to STA3. Note that STA2 and AP1 are in BSS1, while AP2 and STA3 are in BSS2. When the CCA threshold is set to the virtual CCA by the devices in each BSS, transmissions within one BSS will be regarded by devices in the other BSS as interference. Hence, STA2 and AP2 may transmit their data at the same time during the spatial reuse phase. There are three possible options for the durations of the data transmissions from STA2 and AP2 as described below.

Figure 8:
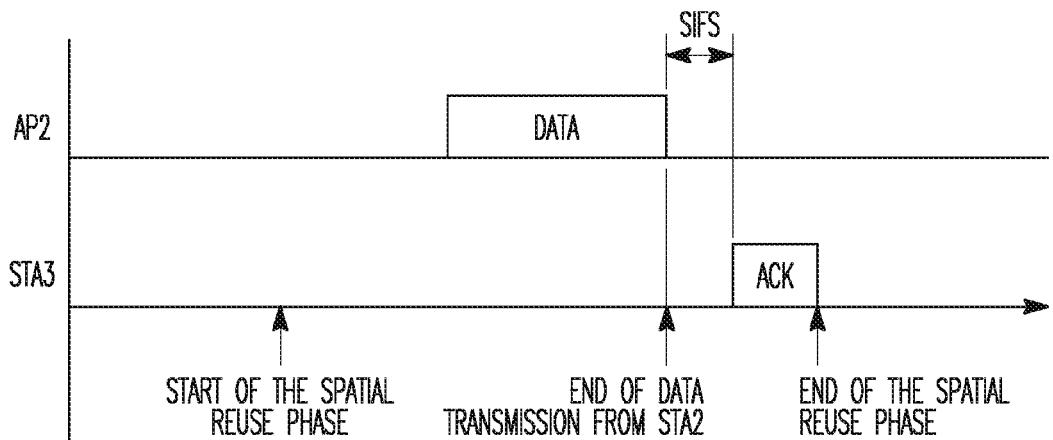
FIG. 8 illustrates an example of data transmission timing during the spatial reuse phase.

In the first option, the data transmission from AP2 ends at the same time as the data transmission from STA2. Hence, STA3 and AP1 can transmit their ACK frames at the same time, which is one SIFS after the data transmission. An example is shown in FIG. 8. This scheme is useful due to the following reasons. The interferences from AP2 or STA3 to AP1 is known to be different. Hence, by making the data transmissions end at the same time, it is guaranteed that only AP2 will transmit when STA2 transmits data, and the interference is only from AP2. This makes it easy to control the interference. There are multiple approaches to make sure that the data transmissions end at a specific time that would include: a) AP2 does additional backoff if the data duration is not long enough, b) AP2 adds null data if the data duration is not long enough, or c) AP2 fragments its existing data if the data duration is too long. To make sure that multiple ACKs can be successfully transmitted by both STA3 and AP1. One approach is to use lowest MCS to transmit the ACK such that ACK has the highest probability to be decoded.

Figure 9:
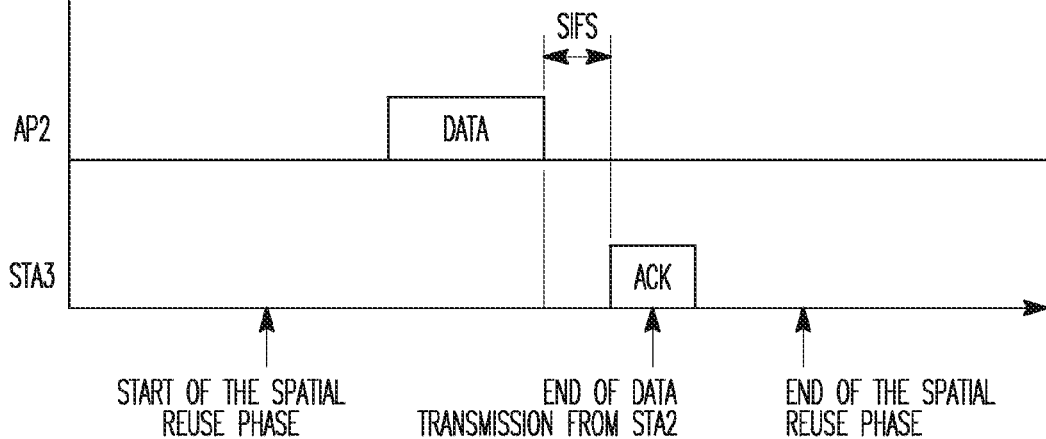
FIG. 9 illustrates an example of data transmission timing during the spatial reuse phase.

In the second option, the data transmission from AP2 ends earlier than the end time of the data transmission from STA2. Then the ACK is transmitted by STA3 one SIFS after the data transmission. An example is shown in FIG. 9. This scheme does not need additional mechanisms from AP2 to control the end time of the data transmission. However, both AP2 and STA3 could transmit when STA2 transmits data. This makes it complicated to control the interference.

Figure 10:
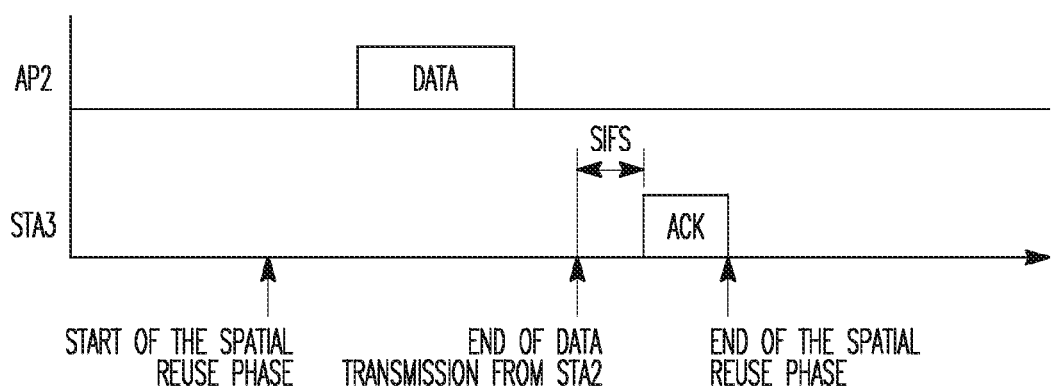
FIG. 10 illustrates an example of data transmission timing during the spatial reuse phase.

In the third option, the data transmission from AP2 ends earlier than the end time of the data transmission from STA2. However, STA3 transmits its ACK to AP2 one SIFS after the end of the data transmission from STA2. An example is shown in FIG. 10. This scheme is useful because only AP2 will transmit when STA2 transmits data. Furthermore, AP2 does not need an additional scheme to control the end time of its data transmission. However, AP2 and STA3 need to conform to the following rules: a) AP2 should set the ACK timeout to be at the end of the spatial reuse phase to wait for the ACK, and b) STA3 should delay the sending of the ACK until near the end of the spatial reuse phase.

ADDITIONAL NOTES AND EXAMPLES

In example 1, a method for operating wireless station device comprises: employing a normal clear channel assessment (CCA) threshold to detect when the wireless channel is busy; and, when operating during a spatial reuse phase, employing a virtual CCA threshold that is greater than the normal CCA threshold.

In Example 2, the subject matter of Example 1 may optionally include announcing to other station devices that a spatial reuse phase is to occur by transmitting a broadcast frame having that information and setting all or part of a network allocation vector (NAV) duration as the spatial reuse phase.

In Example 3, the subject matter of Example 2 may optionally include making the start time of the spatial reuse phase be separated from the end time of the broadcast frame by one short inter-frame space (SIFS).

In Example 4, the subject matter of Example 1 may optionally include announcing to other station devices that a spatial reuse phase is to occur by exchanging a RSR (Request for spatial reuse) frame and a CSR (Clear for Spatial Reuse) frame with another device, wherein the RSR and CSR frames announce that the start time of the spatial reuse phase is the start time of a data transmission that follows the CSR frame and wherein the spatial reuse phase is all or part of the network allocation vector (NAV) durations transmitted by the RSR frame.

In Example 5, the subject matter of Example 1 may optionally include announce to other station devices that a spatial reuse phase is to occur by: doing a request-to-send/clear-to-send (RTS/CTS) exchange with a receiving device wherein the spatial reuse phase begins at the starting time of the subsequent data transmission and lasts for the durations of the data transmission, one SIFS, and an ACK frame from the receiving device; and, wherein the spatial reuse phase is all or part of the NAV duration of the data transmission.

In Example 6, the subject matter of Example 1 may optionally include announcing to other station devices that a spatial reuse phase is to occur by: transmitting data to a receiving device and marking the spatial reuse phase in the header of the data transmission wherein the spatial reuse phase and lasts for the durations of the data transmission, one SIFS, and an ACK frame from receiving device; and, wherein the spatial reuse phase is all or part of the NAV duration of the data transmission.

In Example 7, the subject matter of any of Examples 1 through 6 may optionally include not transmitting broadcast frames during the spatial reuse phase.

In Example 8, the subject matter of any of Examples 1 through 6 may optionally include transmitting to a receiver during the spatial reuse phase only if the signal strength between the device and receiver is above a specified threshold.

In Example 9, the subject matter of any of Examples 1 through 6 may optionally include transmitting data to a receiver during the spatial reuse phase only if the duration of the data transmission is above a specified threshold relative to the duration of the spatial reuse phase.

In Example 10, the subject matter of any of Examples 1 through 6 may optionally include, when acting as a receiver during the spatial reuse phase, setting the virtual CCA threshold to be smaller than the energy level of potential transmitters to the device during the spatial reuse phase.

In Example 11, the subject matter of any of Examples 1 through 6 may optionally include, when acting as a receiver during the spatial reuse phase, set the virtual CCA threshold to be larger than the energy level of non-potential transmitters to the device during the spatial reuse phase.

In Example 12, the subject matter of any of Examples 1 through 6 may optionally include, when acting as a transmitter to a receiver during the spatial reuse phase, setting the virtual CCA threshold to be no larger than the energy level of potential transmitters that are expected to transmit to the receiver during the spatial reuse phase.

In Example 13, the subject matter of any of Examples 1 through 6 may optionally include, when acting as a transmitter to a receiver during the spatial reuse phase, setting the virtual CCA threshold to be no larger than the energy level from the receiver during the spatial reuse phase.

In Example 14, the subject matter of any of Examples 1 through 6 may optionally include setting the virtual CCA threshold without regard to the energy level of another device that is known to be neither transmitting to the device or a receiver of the device during the spatial reuse phase.

In Example 15, the subject matter of any of Examples 1 through 6 may optionally include, when the device is a member of a first basic service set (BSS) and a device in a second BSS announces a spatial reuse phase and transmits data during the spatial reuse phase, transmitting data to a receiver during the spatial reuse phase with that data transmission ending at the same time the data transmission from the second BSS device ends.

In Example 16, the subject matter of any of Examples 1 through 6 may optionally include, when the device is a member of a first basic service set (BSS) and a device in a second BSS device announces a spatial reuse phase and transmits data during the spatial reuse phase, transmitting data to a receiver during the spatial reuse phase with the data transmission ending before the data transmission from the second BSS device ends; and, setting the timeout for receiving the ACK from the receiver at the end of the spatial reuse phase so that the receiver can delay the sending of the ACK until near the end of the spatial reuse phase.

In Example 17, a wireless station device, comprises: a radio transceiver and processing circuitry for communicating with other station devices in a wireless network via a wireless channel; wherein the processing circuitry is to: employ a normal clear channel assessment (CCA) threshold to detect when the wireless channel is busy; and, when operating during a spatial reuse phase, employ a virtual CCA threshold that is greater than the normal CCA threshold.

In Example 18, the subject matter of Example 17 may optionally include wherein the processing circuitry is to perform according to the subject matters of any of Examples 1 through 16.

In Example 19, a computer-readable medium contains instructions for performing any of the methods of Examples 1 through 16.

In Example 20, a wireless station device comprises means for performing any of the methods of Examples 1 through 16.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"-Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus of a high-efficiency (HE) station (STA) (HE-STA) configured to operate in a wireless local area network (WLAN) comprising a basic service set (BSS), the BSS including at least the HE-STA and an access point (AP), the apparatus comprising: a memory; and processing circuitry coupled to the memory,
the processing circuitry configured to:
apply a first clear channel assessment (CCA) threshold to determine when a channel is busy;
apply a second CCA threshold for detection of a packet from another BSS if the HE STA is configured for spatial reuse (SR) operation, the second threshold being greater than the first threshold; and
configure the RE-STA to initiate transmission of a frame during a remaining portion of the detected packet of the other BSS if the HE STA is configured for SR operation and a received signal strength of the packet is below the second CCA threshold.

2. The apparatus of claim 1 wherein the processing circuitry is further configured to refrain from configuring the HE-STA for transmission of the frame during the remaining portion of the detected packet of the other BSS if the HE-STA is configured for SR operation and the received signal strength of the packet of the other BSS is not below the second CCA threshold.

3. The apparatus of claim 2, wherein the processing circuitry is to refrain from configuring the HE-STA for transmission of the frame if the HE-STA is not configured for SR operation and the channel is determined to be busy.

4. The apparatus of claim 2, wherein the processing circuitry includes medium-access control (MAC) layer circuitry, and wherein the MAC layer circuitry is configured to generate signalling to configure the RE-STA to initiate transmission of the frame during the remaining portion of the detected packet of the other BSS if the HE STA is configured for SR operation and the received signal strength of the packet is below the second CCA threshold.

5. The apparatus of claim 4 wherein the MAC layer circuitry is to refrain from updating a network allocation vector (NAV) prior to initiating transmission of the frame during the remaining portion of the detected packet of the other BSS if the HE STA is configured for SR operation and the received signal strength of the packet is below the second CCA threshold.

6. The apparatus of claim 4 wherein the MAC layer circuitry is to configure transmission of the frame within a transmission opportunity limited to a duration of the packet of the other BSS.

7. The apparatus of claim 1 wherein the processing circuitry is configured to determine if a received packet is from another BSS.

8. The apparatus of claim 1 wherein the processing circuitry is configured to ignore transmissions from the other BSS that are above the first CCA threshold if the HE-STA is configured for SR operation.

9. The apparatus of claim 1 wherein the second CCA threshold indicates a greater signal level than the first CCA threshold.

10. The apparatus of claim 9 wherein the memory is configured to store the first CCA threshold.

11. A non-transitory computer-readable storage medium that stores instructions for execution by processing circuitry of a high-efficiency (HE) station (STA) (HE-STA) configured to operate in a wireless local area network (WLAN) comprising a basic service set (BSS), the BSS including at least the HE-STA and an access point (AP), the instructions to configure the processing circuitry to:
apply a first clear channel assessment (CCA) threshold to determine when a channel is busy;
apply a second CCA threshold for detection of a packet from another BSS if the HE STA is configured for spatial reuse (SR) operation, the second threshold being greater than the first threshold; and
configure the HE-STA to initiate transmission of a frame during a remaining portion of the detected packet of the other BSS if the HE STA is configured for SR operation and a received signal strength of the packet is below the second CCA threshold.

12. The computer-readable storage medium of claim 11 wherein the processing circuitry is further configured to refrain from configuring the HE-STA for transmission of the frame during the remaining portion of the detected packet of the other BSS if the HE-STA is configured for SR operation and the received signal strength of the packet of the other BSS is not below the second CCA threshold.

13. The computer-readable storage medium of claim 12, wherein the processing circuitry is to refrain from configuring the HE-STA for transmission of the frame if the HE-STA is not configured for SR operation and the channel is determined to be busy.

14. The computer-readable storage medium of claim 11 wherein the processing circuitry is to configure transmission of the frame within a transmission opportunity limited to a duration of the packet of the other BSS.

15. The computer-readable storage medium of claim 11 wherein the frame is transmitted within a network allocation vector (NAV) duration, the frame announcing a spatial reuse phase.

16. The computer-readable storage medium of claim 11 wherein the processing circuitry is configured to determine if a received packet is from another BSS.

17. The computer-readable storage medium of claim 11 wherein the processing circuitry is configured to ignore transmissions from the other BSS that are above the first CCA threshold if the RE-STA is configured for SR operation.

18. An apparatus of a high-efficiency (HE) station (STA) (HE-STA) configured to operate in a wireless local area network (WLAN) comprising a basic service set (BSS), the BSS including at least the HE-STA and an access point (AP), the apparatus comprising: physical layer circuitry (PHY) and medium access control (MAC) layer circuitry,
wherein the MAC layer circuitry is configured to:
apply a first clear channel assessment (CCA) threshold to determine when a channel is busy;
apply a second CCA threshold for detection of a packet from another BSS if the HE STA is configured for spatial reuse (SR) operation or if the packet from the other BSS is a SR transmission, the second threshold being greater than the first threshold; and
configure the PHY to initiate transmission of a frame during a remaining portion of the detected packet of the other BSS:
if the HE STA is configured for SR operation or if the packet from the other BSS is a SR transmission; and
if a received signal strength of the packet being below the second CCA threshold.

19. The apparatus of claim 18 wherein the processing circuitry is further configured to refrain from configuring the HE-STA for transmission of the frame during the remaining portion of the detected packet of the other BSS:
  if the HE-STA is configured for SR operation or if the packet from the other BSS is a SR transmission; and
  if the received signal strength of the packet of the other BSS is not below the second CCA threshold.

20. The apparatus of claim 19, wherein the processing circuitry is to refrain from configuring the HE-STA for transmission of the frame:
  if the HE-STA is not configured for SR operation or if the packet from the other BSS is not a SR transmission; and
  the channel is determined to be busy.

\* \* \* \* \*

UNITED STATES PATENT AND TRADEMARK OFFICE
CERTIFICATE OF CORRECTION

PATENT NO. : 10,863,373 B2  
APPLICATION NO. : 16/217889  
DATED : December 8, 2020  
INVENTOR(S) : Huang et al.

Page 1 of 1

It is certified that error appears in the above-identified patent and that said Letters Patent is hereby corrected as shown below:

In the Claims

In Column 11, Line 18, in Claim 1, delete "RE-STA" and insert --HE-STA-- therefor In Column 11, Line 37, in Claim 4, delete "RE-STA" and insert --HE-STA-- therefor In Column 12, Line 43, in Claim 17, delete "RE-STA" and insert --HE-STA-- therefor Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*